United States Patent
Ukai et al.

(10) Patent No.: US 6,711,495 B1
(45) Date of Patent: Mar. 23, 2004

(54) METHOD AND APPARATUS FOR GATHERING VEHICLE INFORMATION

(75) Inventors: Seiji Ukai, Tokyo (JP); Yukihiro Kawamata, Hitachi (JP); Tomiharu Yoshida, Hitachinaka (JP); Makoto Shioya, Tokyo (JP); Toshiro Shibata, Urawa (JP); Atsuya Toyama, Kashiwa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/650,374

(22) Filed: Aug. 29, 2000

(30) Foreign Application Priority Data

Aug. 31, 1999 (JP) .......................................... 11-245203

(51) Int. Cl.$^7$ ............................................ G01M 17/00
(52) U.S. Cl. ........................ 701/207; 701/213; 701/200; 701/29; 701/33; 340/436
(58) Field of Search ........................... 701/213, 29, 30, 701/32, 36, 200, 201, 207, 33; 340/436, 901; 342/357.01, 357.06, 357.07, 357.09, 457, 352

(56) References Cited

U.S. PATENT DOCUMENTS

| | | | | |
|---|---|---|---|---|
| 4,608,638 A | * | 8/1986 | Tsikos ........................... 701/35 |
| 4,850,614 A | * | 7/1989 | Shanahan et al. ............... 462/8 |
| 5,019,799 A | * | 5/1991 | Oshiage et al. ............. 340/438 |
| 5,099,245 A | * | 3/1992 | Sagey ..................... 342/357.01 |
| 5,552,789 A | * | 9/1996 | Schuermann ............... 340/5.21 |
| 5,557,254 A | * | 9/1996 | Johnson et al. ............. 340/426 |
| 5,559,520 A | * | 9/1996 | Barzegar et al. ......... 342/357.1 |
| 5,714,948 A | * | 2/1998 | Farmakis et al. ........... 340/961 |
| 5,742,915 A | * | 4/1998 | Stafford ...................... 455/456 |
| 5,797,134 A | * | 8/1998 | McMillan et al. .......... 705/400 |
| 5,844,987 A | * | 12/1998 | Matthews ................... 340/901 |
| 5,974,356 A | * | 10/1999 | Doyle et al. ................. 701/209 |
| 6,028,537 A | * | 2/2000 | Suman et al. ................ 340/988 |
| 6,064,929 A | * | 5/2000 | Migues et al. ................. 701/35 |
| 6,064,970 A | * | 5/2000 | McMillan et al. .............. 705/4 |
| 6,098,048 A | * | 8/2000 | Dashefsky et al. ......... 340/438 |
| 6,161,071 A | * | 12/2000 | Shuman et al. ............... 701/48 |
| 6,202,022 B1 | * | 3/2001 | Ando ......................... 701/200 |
| 6,205,374 B1 | * | 3/2001 | Kljima et al. ................... 701/1 |
| 6,301,531 B1 | * | 10/2001 | Pierro et al. .................. 701/29 |
| 6,314,375 B1 | * | 11/2001 | Sasaki et al. ................. 702/34 |

* cited by examiner

Primary Examiner—Marthe Y. Marc-Coleman
(74) Attorney, Agent, or Firm—Hogan & Hartson, LLP

(57) ABSTRACT

A method o gathering and analyzing vehicle information is disclosed. A central vehicle-information management center gathers first vehicle information gathered in real time, including position of the vehicle, control of vehicle, and conditions of vehicle parts, and gathers second vehicle information including vehicle type, vehicle identification number, and information regarding users of the vehicles. The central vehicle information management center performs a statistical analysis for the plurality of vehicles based on the first and second information. The first information is transmitted by a transmitter provided on each vehicle, and acquired via a satellite communication system and/or a land-based wireless communication system.

4 Claims, 6 Drawing Sheets

METHOD AND APPARATUS FOR GATHERING VEHICLE INFORMATION

BACKGROUND OF THE INVENTION

1. Field of the Invention

The present invention relates to a method and an apparatus for gathering information on a movable body by using a satellite communication system or another movable-body communication system such as a ground-wave digital communication system, a cellular phone and a DSRC (Dedicated Short Range Communication) system.

2. Description of the Prior Art

A car navigation system for displaying the present position of a vehicle on a screen has been implemented and becoming popular. In recent years, a communication navigation system connecting a cellular phone to a car navigation system has also been implemented.

As a means for acquiring information on the state of a vehicle, partial history-data is created at inspection of the vehicle at a car dealer and delivered to a complete-car manufacturer or a car-part manufacturer through typically wire communication instead of being created in a real-time manner.

As a means for acquiring information on the condition of a vehicle, in a dealer, there is provided a system for reporting partial history data at inspection of the vehicle. Since the frequency of the gathering of information is low and requests for vehicle inspection to be conducted at a dealer appointed by a complete-car manufacturer are uncertain, however, it is difficult for the complete-car manufacturer and a car-part manufacturer to create information useful for marketing of each car type and useful for statistical analyses and to feed back the information to a design team. In addition, as a movable-body communication technology, in order to gather and manage data of each car type produced by the complete-car manufacturer by using cellular phones, which become popular at a fast pace, it is necessary to obtain the phone number of each user. It is thus difficult to gather information on a plurality of specific cars and to distribute information in a collective manner.

Thus, information on the present condition of a vehicle is not collected continuously in a real-time manner. Even if the information is collected continuously in a real-time manner, the collected information is very limited so that the utilization of the information cannot help being said to be little. Continuous gathering of information on the state of a vehicle is indispensable to statistical analyses of the vehicle and the type of the vehicle. If there are no statistics, subsequent diagnostic analyses cannot be conducted as well.

SUMMARY OF THE INVENTION

It is thus an object of the present invention addressing the problems described above to provide a vehicle-information gathering method and a vehicle-information gathering apparatus, which are capable of continuously gathering information on the present condition of a vehicle in detail with a high degree of reliability in a real-time manner and capable of analyzing the information.

The present invention is characterized in that:

information on the state of a vehicle is divided into information on the position of the vehicle and other information such as information for controlling the vehicle, information on the states of car parts, information on the body of the vehicle and information on a part-replacement history of the vehicle; and the information on the position of the vehicle can be acquired and gathered from a reflection signal obtained as a result of an artificial satellite's reflection of a signal transmitted by an antenna provided on the vehicle to the artificial satellite.

The conventional vehicle-information gathering apparatus acquires information on the position of a vehicle from a reflection signal reflected by an artificial satellite as a result of reflection of a signal transmitted by an antenna provided on the vehicle to the artificial satellite and uses the information in car navigation. However, the conventional vehicle-information gathering apparatus does not collect and analyze the acquired information on the position of the vehicle.

Another characteristic of the present invention is a capability of analyzing a combination of the information on the position of the vehicle acquired in the way described above and other information. By utilizing the two characteristics described above, it is possible to accumulate detailed and reliable vehicle information in a real-time manner for each individual vehicle and to expect applications of the present invention.

To put it concretely, the present invention provides the following methods and apparatuses.

According to one aspect of the present invention, there is provided a vehicle-information gathering method for gathering information on a state of a vehicle, comprising: acquiring and collecting pieces of information on a position of said vehicle from a reflection signal reflected by an artificial satellite as a result of reflection of a position signal transmitted by an antenna provided on said vehicle to said artificial satellite.

According to another aspect of the present invention, there is provided a vehicle-information gathering method for gathering information on a state of a vehicle, said method comprising the steps of:

acquiring and gathering pieces of information on a position of said vehicle from a reflection signal reflected by an artificial satellite as a result of reflection of a position signal transmitted by an antenna provided on said vehicle to said artificial satellite; and acquiring and gathering signals reflected by said artificial satellite as a result of reflection of information signals used for representing information on control of said vehicle or information on conditions of vehicle parts and transmitted from said antenna to said artificial satellite or transmitted by said vehicle through a wireless-communication apparatus such as a DSRC (Dedicated Short Range Communication) device or a cellular phone, whereby individual pieces of information on a state of a vehicle are gathered in a real-time manner.

In an embodiment, there is provided a vehicle-information gathering method wherein said information on control of said vehicle or the information on conditions of vehicle parts are transmitted after said information on a position of said vehicle has entered a reception mode.

In an embodiment, there is provided a vehicle-information gathering method wherein said information on a position of said vehicle is a latitude and a longitude obtained from a navigation terminal.

In an embodiment, there is provided a vehicle-information gathering method wherein said information on control of said vehicle includes a braking amount, a steering angle, an accelerator-pedal angle, a gear count, an ABS (anti-skid braking system) operating time and a VSC (Velocity Suppression Control) operating time.

In an embodiment, there is provided a vehicle-information gathering method wherein said information on conditions of vehicle parts includes a lubricant temperature, a lubricant pressure, a battery voltage, a fuel-residue quantity, a CPU state and a muffler temperature.

According to still another aspect of the present invention, there is provided a vehicle-information gathering method for gathering information on a state of a vehicle, said method comprising the steps of:

acquiring and gathering pieces of information on a position of said vehicle from a reflection signal reflected by an artificial satellite as a result of reflection of a position signal transmitted by an antenna provided on said vehicle to said artificial satellite;

acquiring and gathering signals reflected by said artificial satellite as a result of reflection of information signals generated by a sensor provided on said vehicle and transmitted from said antenna to said artificial satellite or acquiring and gathering said information signals generated by said sensor and transmitted by said vehicle through a wireless-communication apparatus such as a DSRC (Dedicated Short Range Communication) device or a cellular phone, whereby individual pieces of information on a state of a vehicle are gathered in a real-time manner; and acquiring and gathering information on said vehicle such as a car type and a vehicle number input separately for said vehicle and information on a user of said vehicle.

According to further aspect of the present invention there is provided a vehicle-information gathering method for gathering information on a state of a vehicle, said method comprising the steps of:

acquiring and gathering pieces of information on a position of said vehicle from a reflection signal reflected by an artificial satellite as a result of reflection of a position signal transmitted by an antenna provided on said vehicle to said artificial satellite;

acquiring and gathering signals reflected by said artificial satellite as a result of reflection of information signals used for representing information on control of said vehicle or information on conditions of vehicle parts and transmitted from said antenna to said artificial satellite or transmitted by said vehicle through a wireless-communication apparatus such as a DSRC (Dedicated Short Range Communication) device or a cellular phone, whereby individual pieces of information on a state of a vehicle are gathered in a real-time manner;

acquiring and gathering pieces of information on a state of said vehicle from a reflection signal reflected by said artificial satellite as a result of reflection of an information signal of said information on a state of said vehicle transmitted by a diagnosing system provided on said vehicle to said artificial satellite; and acquiring and gathering signals reflected by said artificial satellite as a result of reflection of information signals used for representing information on said vehicle such as a car type and a vehicle number input separately for said vehicle and information on a user of said vehicle.

In an embodiment, there is provided a vehicle-information gathering method wherein said individual pieces of information on said vehicle are input from an IC card having said information recorded.

In an embodiment, there is provided a vehicle-information gathering method wherein said individual pieces of information on said vehicle are also input from an artificial satellite.

In an embodiment, there is provided a vehicle-information gathering method wherein said collected individual pieces of information on said vehicle are encrypted and stored in a memory.

According to still further aspect of the present invention, there is provided a vehicle-information gathering method, said method further including the steps of:

based on the information collected, conducting for each car type a statistical analysis on:
information on how much an installed new function has been used; and
information on whether or not there is a vehicle-utilization characteristic such as driving times on each day, driving days in each week and commercial use for each car type, and storing statistics in a data base.

According to still another aspect of the present invention, there is provided a vehicle-information gathering method, said method further including the steps of:

based on the information collected, conducting for each car type a statistical analysis on:
information on whether a temperature is normal or abnormal;
information on whether a pressure is normal or abnormal; and
information on whether or not the number of years in which each vehicle part has been used so far is reasonable, and storing statistics in a data base.

In an embodiment, there is provided a vehicle-information gathering method wherein said collected individual pieces of information on said vehicle are used as a basis for collecting information on said vehicle as statistics for each car type and each vehicle part.

According to further aspect of the present invention, there is provided a vehicle-information gathering apparatus for gathering information on a state of a vehicle, said apparatus comprising:

a vehicle-position-information gathering means for acquiring and gathering pieces of information on a position of said vehicle from a reflection signal reflected by an artificial satellite as a result of reflection of a position signal transmitted by an antenna provided on said vehicle to said artificial satellite;

a first vehicle-state-information gathering means for acquiring and gathering pieces of first information on a state of said vehicle reflected by said artificial satellite as a result of reflection of a signal used for representing information on control of said vehicle or information on conditions of vehicle parts and transmitted from said antenna to said artificial satellite; and a second vehicle-state-information gathering means for acquiring and gathering pieces of second information on a state of said vehicle transmitted by said vehicle through a wireless-communication apparatus such as a DSRC (Dedicated Short Range Communication) device or a cellular phone.

In an embodiment, there is provided a vehicle-information gathering apparatus further comprising an IC-card-information input means for gathering information on said vehicle such as a car type and a car number and information on a user of said vehicle, which are entered separately for said vehicle, from an IC card having said vehicle information and said user information stored.

According to still further aspect of the present invention, there is provided a vehicle-information gathering method for gathering information on a state of a vehicle, wherein said information on a state of a vehicle is collected by acquiring and gathering signals reflected by said artificial satellite as a result of reflection of information signals used for representing information on control of said vehicle or information on conditions of vehicle parts and transmitted from said antenna to said artificial satellite, whereby individual pieces of information on a state of a vehicle are gathered in a real-time manner.

According to still another aspect of the present invention, there is provided a vehicle-information gathering method for gathering information on a state of a vehicle, said method comprising the steps of:

acquiring and gathering information on said vehicle such as a car type and a vehicle number input separately for said vehicle or information on a user of said vehicle first; and then acquiring and gathering signals reflected by an artificial satellite as a result of reflection of information signals generated by a sensor provided on said vehicle and transmitted from an antenna provided on said vehicle to said artificial, whereby individual pieces of information on a state of a vehicle are gathered in a real-time manner.

According to still another aspect of the present invention, there is provided a vehicle-information gathering method for gathering information on a state of a vehicle, said method having the steps of:

acquiring and gathering signals reflected by an artificial satellite as a result of reflection of information signals used for representing information on control of said vehicle or information on conditions of vehicle parts and transmitted from an antenna provided on said vehicle to said artificial satellite; and acquiring and gathering pieces of information on a state of said vehicle from a reflection signal reflected by said artificial satellite as a result of reflection of an signal of said information a state of said vehicle transmitted by a diagnosing system provided on said vehicle to said artificial satellite in accordance with a command to transmit a result of a diagnosis generated by said diagnosing system.

According to still another aspect of the present invention, there is provided a vehicle-information gathering apparatus for gathering information on a state of a vehicle, said apparatus comprising:

a first vehicle-state-information gathering means for acquiring and gathering pieces of first information on a state of said vehicle reflected by an artificial satellite as a result of reflection of a signal used for representing information on control of said vehicle or information on conditions of vehicle parts and transmitted from an antenna provided on said vehicle to said artificial satellite; and a second vehicle-state-information gathering means for acquiring and gathering pieces of second information on a state of said vehicle transmitted by said vehicle through a wireless-communication apparatus such as a DSRC (Dedicated Short Range Communication) device or a cellular phone.

DESCRIPTION OF THE PREFERRED EMBODIMENT

A preferred embodiment of the present invention is explained by referring to diagrams.

Figure 1:
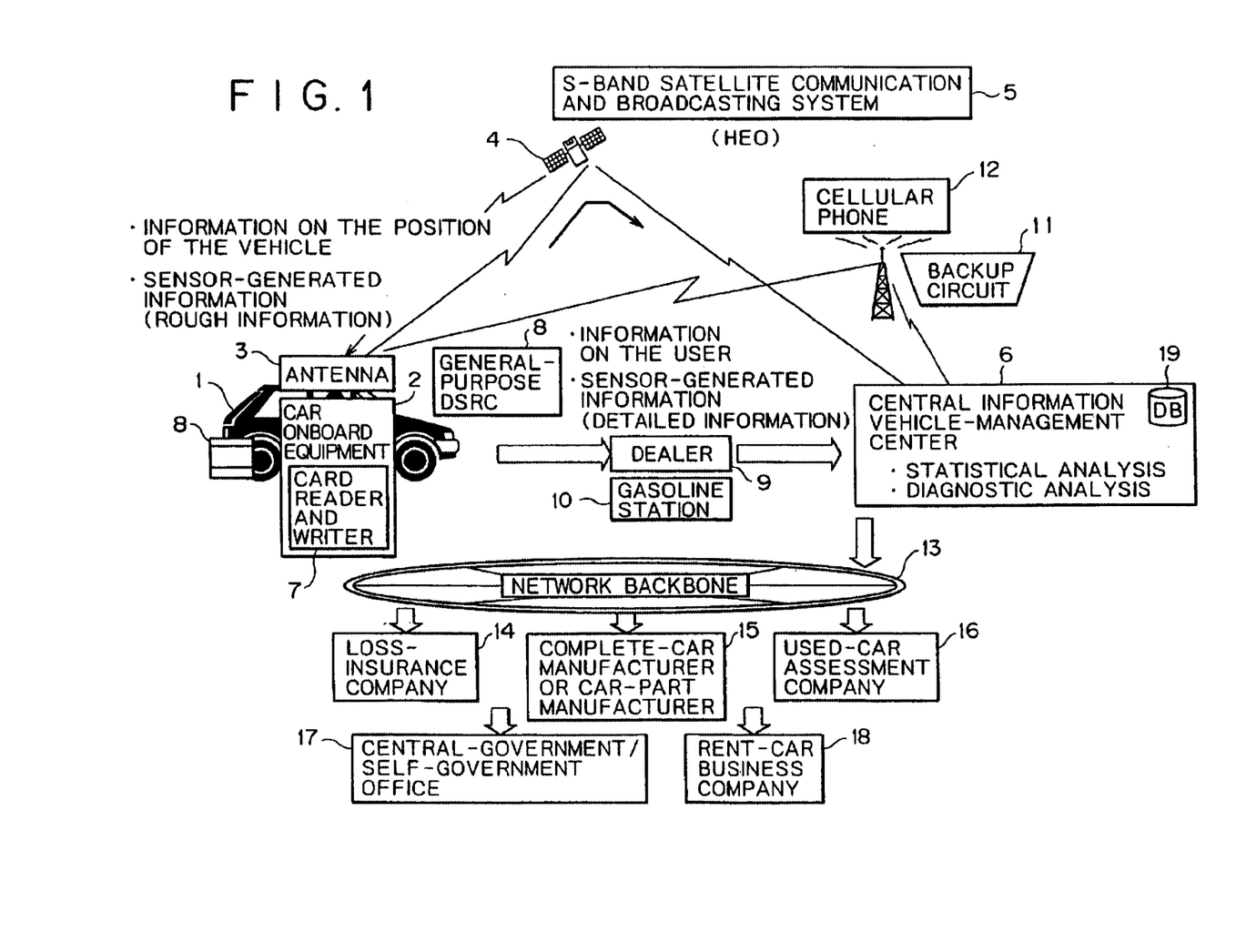
FIG. 1 is a system conceptual diagram showing an embodiment of the present invention.

FIG. 1 is a system conceptual diagram. In the system shown in FIG. 1, information on the state of a vehicle 1 generated by the vehicle 1 is split into two pieces of information. One of the two pieces of information, mainly, information on the position of the vehicle, is transmitted to a central information management center 6 from car onboard equipment 2 by way of an antenna 3 and an artificial satellite 4 on a real-time manner from time to time. The car onboard equipment 2 accommodates a variety of control apparatuses provided on the vehicle 1. The information on the position of the vehicle 1 may include a latitude and a longitude received from a navigation terminal (also referred to as a car navigation apparatus) employed in the car onboard equipment 2. The other piece of information, mainly, information on the driver, is transmitted to the central information management center 6 typically from the car onboard equipment 2 by way of a DSRC device or a cellular phone 12.

A signal transmitted by the vehicle is reflected by the artificial satellite 4 to the central vehicle-information management center 6 as information on a vehicle by typically an S-band satellite communication and broadcasting system (HEO) 5.

The vehicle 1 has a variety of sensors for detecting the operating state of the vehicle 1 to produce vehicle-sensor-generated information. Prior to transmission of various kinds of vehicle-sensor-generated information, information on the vehicle 1 for identifying the type of the vehicle 1 or information on the user may be transmitted to the central vehicle-information management center 6 in advance to be cataloged therein. The information on the vehicle 1 includes the type of the car, the serial number of the car body, the manufacturing date and the name of an urban or rural prefecture in which the vehicle 1 is registered. The vehicle 1 also has a card reader and writer 7 for handling a user dedicated card 8 such as a credit card for paying a toll-road fee. On the user dedicated card 8, information on the user is recorded. The information on the user includes the name of the user, the acquisition date of the driver's license, a driving history and a bank account number. The user dedicated card 8 can also be used for paying a vehicle insurance premium to be described later in case the user effects such insurance.

Part of the vehicle-sensor-generated information and the information on the body of the vehicle are transmitted to the artificial satellite 4 from the car onboard equipment 2 by way of the antenna 3 as outline information. Much like the information on the position of the vehicle, the outline information reflected by the artificial satellite 4 is transmitted to the central vehicle-information management center 6 by typically the S-band satellite communication and broadcasting system 5 to be collected in the central vehicle-information management center 6.

Typically, a general-purpose DSRC (Dedicated Short Range Communication) system transmits the remaining information on the vehicle to the central vehicle-information management center 6 by way of a dealer 9 or directly. The remaining information on the vehicle includes the information on the user and the information on the body of the vehicle as well as other part of the vehicle-sensor-generated information (detailed information). When gasoline is purchased at a gasoline station 10 by using the user dedicated card 8, information related to the payment may be transmitted to the central vehicle-information management center 6 to be collected therein through the gasoline station 10 in the same way. Thereby, fuel consumption and information on the engine can be obtained. This other information on the vehicle is supplied to the central vehicle-information management center 6 by using a backup circuit 11 serving as a wireless communication means.

The information on the vehicle collected at the central vehicle-information management center 6 is treated as statistics and subjected to a statistical or diagnostic analysis. The information on the vehicle completing the statistical or diagnostic analysis is stored in a data base (DB) 19 of a computer and to be sold and supplied to a loss-insurance company 14, a complete-car and part manufacturer 15, a used-car assessment company 16, a central-government/self-government office 17 and a rent-car business company 18 by way of a communication means such as a network backbone 13 or a public-telephone line, or the Internet. Of course, the information is supplied not without limitation. Instead, the information is supplied in accordance with a contract or under some predetermined restrictions. Similarly, individual vehicles each supply information on the vehicle not without limitation, but supply the information in accordance with a contract or under some predetermined restrictions. Moreover, a user supplying such information may be rewarded with something commensurate with the information.

Figure 2:
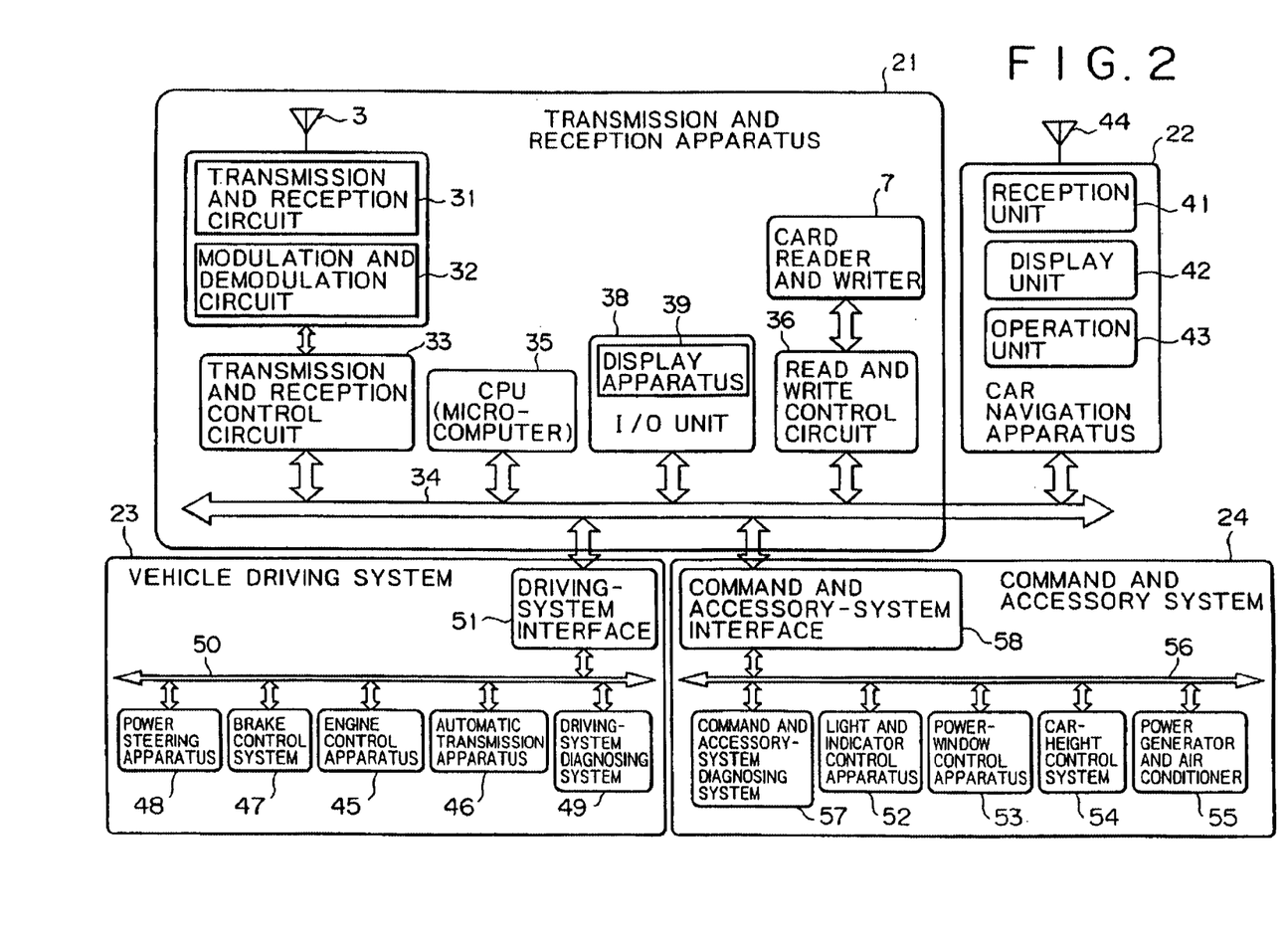
FIG. 2 is a block diagram showing functions of car onboard equipment.

FIG. 2 is a diagram showing the car onboard equipment 2. As shown in the figure, the car onboard equipment 2 comprises a transmission and reception apparatus 21, a car navigation apparatus 22, a vehicle-driving system 23 and a command and accessory system 24.

A signal received by the antenna 3 is supplied to a modulation and demodulation circuit 32 by way of a transmission and reception circuit 31. In the modulation and demodulation circuit 32, the signal is demodulated before being subjected to necessary processing such as an encryption process in a transmission and reception control circuit 33. After completing the encryption process, the signal is supplied to a CPU 35 by way of a bus 34.

The CPU 35 produces information to be transmitted, outputting the information to the transmission and reception control circuit 33, which carries out necessary processing such as a decryption process on the information to be transmitted. The information to be transmitted is then modulated in the modulation and demodulation circuit 32 before being supplied to the antenna 3 for transmission by way of the transmission and reception circuit 31.

The card reader and writer 7 reads out information from the user dedicated card 8, and supplies the information to the CPU 35 by way of a read and write control circuit 36. On the other hand, the CPU 35 outputs data to be written into the user dedicated card 8 to the read and write control circuit 36, which writes the data into the user dedicated card 8 by way of the card reader and writer 7.

The user operates an input/output unit 38 to give a command to the CPU 35 to carry out processing. The CPU 35 displays necessary information on a display screen 39 of the I/O unit 38. The CPU 35 also outputs sound even though this operation is not explicitly shown in the figure.

The car navigation apparatus 22 comprises a reception unit 41, a display unit 42, an operation unit 43 and an antenna 44. In the car navigation apparatus 22, the present position, a route traveled so far and a map or information on roads are stored. The car navigation apparatus 22 supplies necessary information to the CPU 35 at a request made by the CPU 35.

Enclosed in a rectangular block, the transmission and reception apparatus 21 includes the antenna 3, the transmission and reception circuit 31, the modulation and demodulation circuit 32, the transmission and reception control circuit 33, the CPU 35, the I/O unit 38, the card reader and writer 7 and the read and write control circuit 36. The transmission and reception apparatus 21 is a system employed in the embodiment of the present invention. In order to obtain necessary information, the transmission and reception apparatus 21 is further connected to other apparatuses and systems. The other apparatuses and systems are explained as follow.

The car driving system 23 comprises an engine control apparatus 45, an automatic transmission apparatus 46, a brake control apparatus 47 (an anti-skid control apparatus), a power steering apparatus 48 and a driving-system diagnosing system 49 for diagnosing the engine control apparatus 45, the automatic transmission apparatus 46, the brake control apparatus 47 and the power steering apparatus 48 from time to time. The engine control apparatus 45, the automatic transmission apparatus 46, the brake control apparatus 47, the power steering apparatus 48 and the driving-system diagnosing system 49 are connected to each other by an internal bus 50. To be more specific, the driving-system diagnosing system 49 diagnoses the engine control apparatus 45, the automatic transmission apparatus 46, the brake control apparatus 47 and the power steering apparatus 48 by forming judgments as to whether or not their internal sensors generate values such as currents and voltages beyond predetermined ranges. The driving-system diagnosing system 49 records the sensor values such as currents and voltages at predetermined intervals or each time a problem arises. The recorded values are supplied to the CPU 35 by way of a driving-system interface 51.

The command and accessory system 24 comprises a light and indicator control apparatus 52 for controlling lights and indicators such as direction indicators and applied-brake indicators, a power-window control apparatus 53, a car-height control apparatus 54 for increasing and decreasing the height of the car and adjusting a dumper and other equipment 55 including a power generator and an air conditioner. An internal bus 56 connects the light-indicator control apparatus 52, the power-window control apparatus 53, the car-height control apparatus 54 and the other equipment 55 to each other. A command and accessory-system diagnosing system 57 diagnoses the light-indicator control apparatus 52, the power-window control apparatus 53, the car-height control apparatus 54 and the other equipment 55 to determine whether or not they are operating and, if they are operating, whether the operations are normal or abnormal. Thus, an abnormality can be detected and the operating status can be recorded. If necessary, the CPU 35 retrieves the stored data such as information on abnormalities and the operating status from the command and accessory system 24 through a command and accessory system interface 58.

When the CPU 35 receives a diagnosis result from the driving-system diagnosing system 49 or the command and accessory-system diagnosing system 57, the CPU 35 forms a judgment as to whether or not it is necessary to transmit the diagnosis result to the artificial satellite 4. When the outcome of the judgment indicates that it is necessary to transmit the diagnosis result to the artificial satellite 4, the CPU 35 gives a command to the transmission and reception control circuit 33 to transmit the diagnosis result to the artificial satellite 4. The transmission and reception control circuit 33 has a channel used by the central information management center 6 for acquiring permission for transmission of information to the artificial satellite 4 as will be described later by referring to a flowchart shown in FIG. 5. The channel is assigned in advance to the vehicle. The transmission and reception control circuit 33 receives a request for such permission from the central information management center 6 through the artificial satellite 4. Then, the transmission and reception control circuit 33 transmits the diagnosis result to the artificial satellite 4 by using this channel. Prior to the transmission of the diagnosis result, the CPU 35 is capable of supplying data such as the car type of the vehicle, the name of the vehicle or the user to the central vehicle-information management center 6 by giving a command to the transmission and reception control circuit 33 to transmit the data to the artificial satellite 4 or through a DSRC device or a cellular phone 12 as described above. The CPU 35 also receives various kinds of information transmitted by a variety of sensors provided on the vehicle to the CPU 35 directly not through the driving-system diagnosing system 49 or the command and accessory-system diagnosing system 57. In this case, the CPU 35 transmits the information to the central vehicle-information management center 6 by executing a similar function. In the central vehicle-information management center 6, the information is collected and used for carrying out a diagnosis. In this way, information on the vehicle can be collected.

Figure 3:
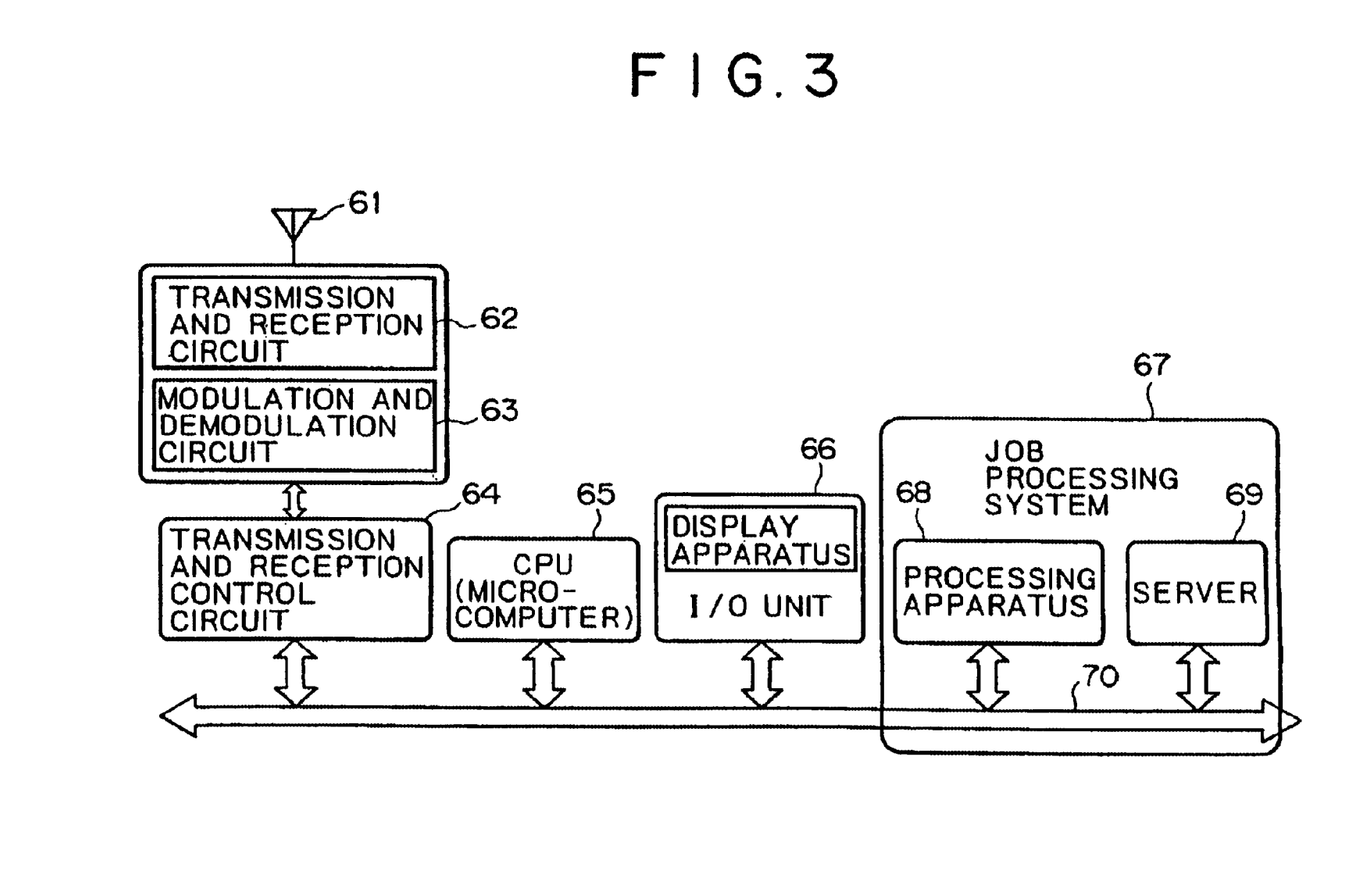
FIG. 3 is a block diagram showing functions of a central vehicle-information management center.

FIG. 3 is a diagram showing the system configuration of the central vehicle-information management center 6 for receiving information from a variety of vehicles.

In the central vehicle-information management center 6 shown in the figure, an antenna 61, a transmission and reception circuit 62, a modulation and demodulation circuit 63, a transmission and reception control circuit 64, a CPU 65 and an I/O unit 66 respectively have the same functions as the antenna 3, the transmission and reception circuit 31, the modulation and demodulation circuit 32, the transmission and reception control circuit 33, the CPU 35 and the I/O unit 38 described earlier. The central vehicle-information management center 6 also has a job processing system 67 including a processing apparatus 68 functioning as a computer separately from the CPU 65. The processing apparatus 68 has a memory for storing a large amount of data. A bus 70 connects the processing apparatus 68 to a server 69 as well as to the transmission and reception control circuit 64, the CPU and the I/O unit 66.

The job processing system 67 organizes data by car type, by user and by car manufacturing serial number and saves the organized data for later use by the server 69. If necessary, the server 69 retrieves the stored data and outputs the retrieved data.

Figure 4:
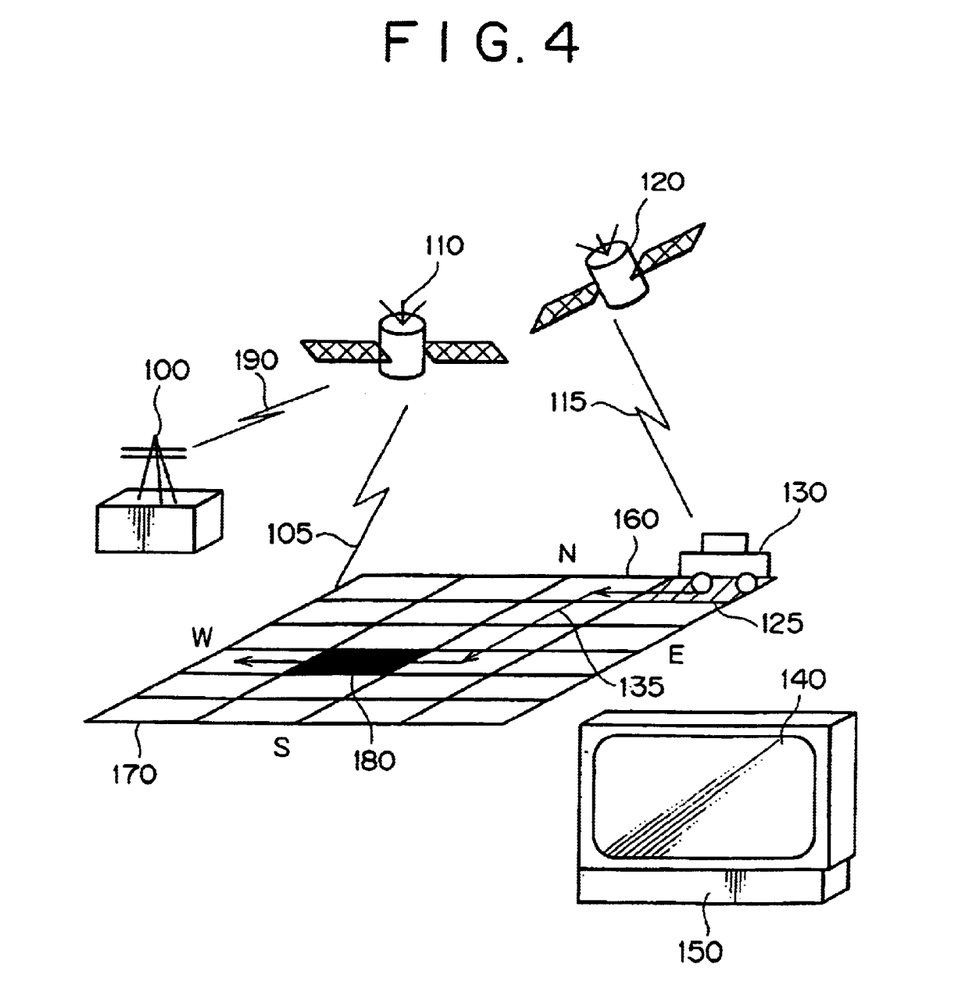
FIG. 4 is a conceptual diagram showing functions of a broadcasting system.

FIG. 4 is a diagram showing a satellite communication and broadcasting system in a simple and plain manner.

In the figure, reference numeral 100 denotes a broadcasting station and reference numeral 110 denotes a broadcasting artificial satellite, which is denoted by reference numeral 4 in FIG. 1. Reference numerals 120 and 130 denote a GPS (Global Positioning System) satellite and a vehicle respectively. Reference numeral 150 denotes a car navigation system and reference numeral 140 denotes information displayed on the car navigation system 150. It should be noted that the car navigation system 150 has a reception apparatus. Mounted on the vehicle 130, the car navigation system 150 determines the position of the vehicle 130, searches an area for roads to a destination and presents information to the driver.

Reference numeral 190 denotes a satellite broadcasting transmission signal transmitted by the broadcasting station 100 and reference numeral 105 denotes a satellite broadcasting signal transmitted by the broadcasting artificial satellite 110. Reference numeral 115 denotes a position confirmation signal transmitted by the GPS satellite 120 and reference numeral 170 denotes an entire area range to receive transmitted information. Reference numeral 135 denotes a travel route of the vehicle 130 and reference numeral 160 denotes an area in the entire area range 170 for the travel route 135 of the vehicle 130. Reference numeral 180 denotes an area in the entire area range 170 to receive specific propagated information and reference numeral 125 denotes the present position of the vehicle 130 in the entire area range 170.

As shown in FIG. 4, the entire area range 170 is divided into small areas. The broadcasting station 100 and the car navigation system 150 share the same information on segmentation of the entire area range 170 into the small areas. The car navigation system 150 is capable of determining the position of the vehicle 130 in conjunction with the GPS satellite 120, and also capable of receiving the satellite broadcasting signal 105 from the broadcasting artificial satellite 110 and displaying information.

The broadcasting station 100 determines the specific area 180 as an area to receive specific propagated information and adds data identifying the specific area 180 to the information. The broadcasting station 100 then transmits the information and the data to the broadcasting artificial satellite 110 as the satellite broadcasting transmission signal 190. Receiving the satellite broadcasting transmission signal 190, the broadcasting artificial satellite 110 transmits the information as the satellite broadcasting signal 105 to the range 170.

In the mean time, the car navigation system 150 receives the position confirmation signal 115 from the GPS satellite 120 to determine the position of the vehicle 130. Then, the car navigation system 150 identifies the area 125 in the entire area range 170 in which the vehicle 130 exists. In addition, the car navigation system 150 finds the area 160 from a stored input entered by the driver in advance or from the travel route 135 found by using a route search function. Information on the area 160 can be displayed to the driver.

When the car navigation system 150 receives the satellite broadcasting signal 105 as a broadcast, the car navigation system 105 extracts information identifying an area from the satellite broadcasting signal 105. The car navigation system 105 extracts information identifying the specific area 180 to receive specific propagated information. In this way, the car navigation system 150 is capable of selecting the travel route 135 from the area 125 in which the vehicle 130 exists to the desired destination by way of the specific area 180 so that the driver can obtain the specific propagated information.

As seen form the earth, the broadcasting artificial satellite 110 is an artificial satellite that always appears to be located on the top of the sky so that the car navigation system 150 can be considered to be capable of receiving a signal from the broadcasting artificial satellite 110 with the reception sensitivity of the car navigation system 150 focused on the broadcasting artificial satellite 110. It is thus possible to reduce the magnitude of a hindrance to reception of a signal caused by a construction such as a building, and broadcasting is therefore never interrupted.

Figure 5:
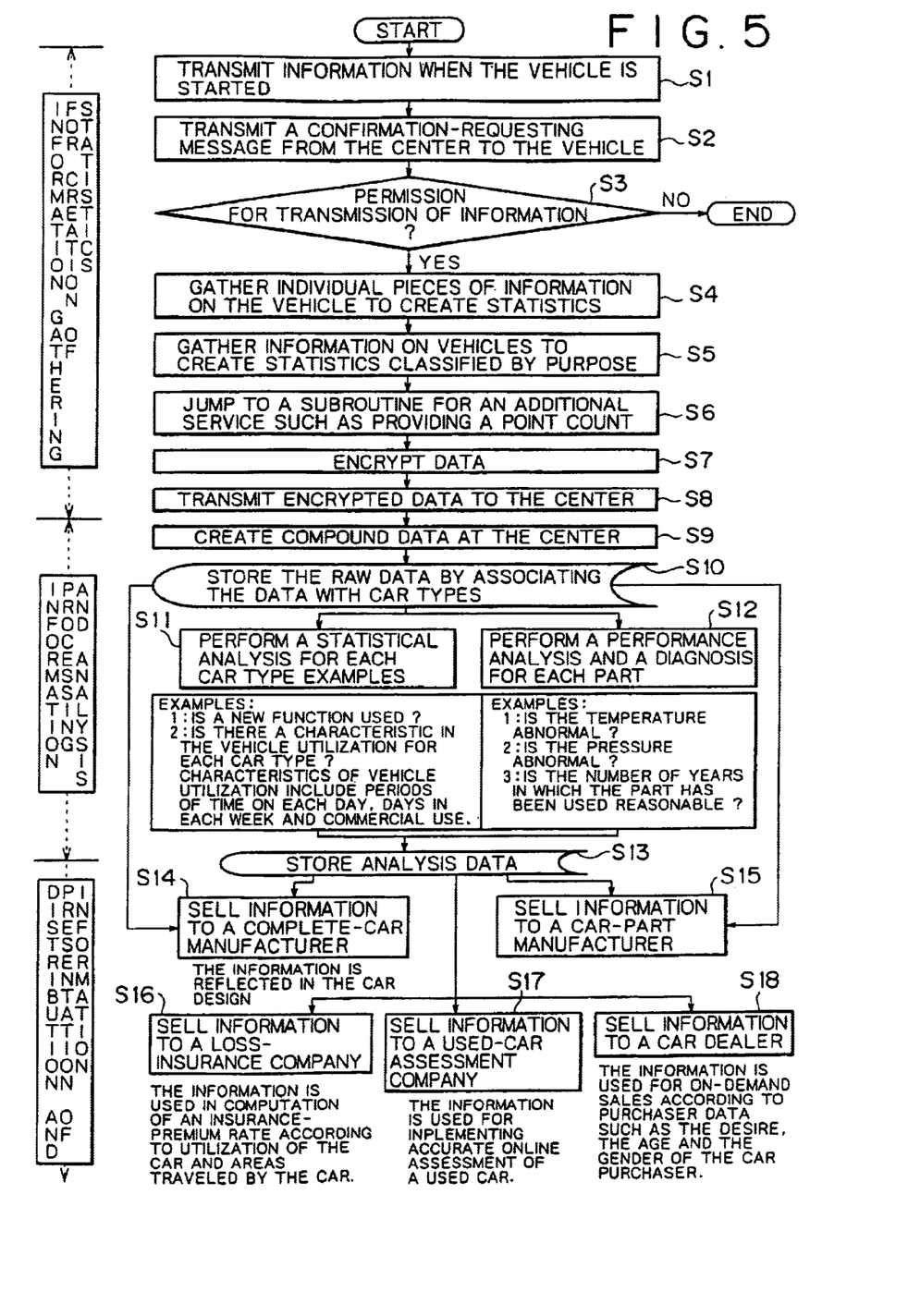
FIG. 5 shows a flowchart representing a vehicle-state online management method.

FIG. 5 shows a flowchart representing a method of gathering, analyzing and processing information on a state of a vehicle 1. In the flowchart shown in the figure, 1: At a step S1 right after the user serving as the driver of the vehicle 1 turns on the ignition key to start the engine, an activation start signal is transmitted automatically from the vehicle 1 to the central vehicle-information management center 6. As a communication system, the HEO path, which is considered to have fewest uncommunicatable states, is mainly adopted even though a DSRC device or a cellular phone is also capable of communicating with the central vehicle-information management center 6.

2: Right after receiving the signal from the vehicle 1, the central vehicle-information management center 6 transmits a message requesting the user for confirming permission for providing the central vehicle-information management center 6 with information to the vehicle 1 at a step S2.

3: At a step S3, the user is requested to confirm the permission for providing the central vehicle-information management center 6 with information. The message requesting the user for confirming permission for providing the central vehicle-information management center 6 with information may be a voice or a display. The user may confirm the permission by pressing two or more buttons on the car onboard equipment 2.

4: Only if the permission for providing the central vehicle-information management center 6 with information is confirmed, are individual pieces of information on a vehicle collected from individual vehicles to create statistics at a step S4. At the next step S5, information on vehicles is collected to create statistics classified by purpose such as by insurance company on the basis of these individual pieces of information.

5: If the permission for providing the central vehicle-information management center 6 with information is confirmed, a system for computing the number of service points (or a service-point count) is activated at a step S6. The number of service points increases proportionally to the travel distance and the length of the engine operating time. That is to say, the number of service points is computed in accordance with a rule stating that, the more the vehicle is driven, the more services that can be rendered to the driver of the vehicle. Service-point counts are managed not only for each car, but also for each user. For this reason, the user inserts its own ID card into the car onboard equipment 2 to enter information on the user such as the age, the gender and blood type to be transmitted by the car onboard equipment 2 to the central information management center 6.

6: The information on the state of the vehicle is described below. Even if the permission for providing the central vehicle-information management center 6 with information is confirmed, a level of the information that can be disclosed can be selected.

6-1: Information on the position of the vehicle: A latitude and a longitude received from a navigation terminal.

6-2: Information on control of the vehicle: A braking amount, a steering angle, an accelerator-pedal angle, a gear count, an ABS (anti-skid braking system) operating time and a VSC (Velocity Suppression Control) operating time. The VSC is a slip control mechanism.

6-3: Information on conditions of vehicle parts: A lubricant temperature, a lubricant pressure, a battery voltage, a fuel-residue quantity, a CPU state and a muffler temperature.

7: The data is encrypted at the next step S7 and transmitted to the central vehicle-information management center 6 at the subsequent step S8.

The processing carried out so far is a function to gather information. Next, a subsequent function to process and analyze information is explained.

8: At the next step S9, compound data is created.

9: Raw data is stored in a data base for every car type of each car manufacturer.

10: At steps S10 and S11, a statistical analysis is carried out for each car type.

The statistical analyses are conducted to find answers to the following questions:

10-1: How much has a new function been used? The new function is typically provided as a function to exhibit a characteristic superior to vehicles produced by other car manufacturers.

10-2: Is there a characteristic in the utilization of the vehicle for each car type? Examples of the vehicle-utilization characteristic are driving times on each day, driving days in each week and commercial use.

11: At the step S10 and a step S12, a performance analysis is carried out for each part to find answers to the following questions:

11-1: Is the temperature of the part abnormal?

11-2: Is the pressure of the part abnormal?

11-3: Is the number of years in which the part has been used reasonable?

12: At the next step S13, analysis data is stored in the data base.

Next, a service to present data to a complete-car manufacturer and a car-part manufacturer is explained.

The service is rendered to provide a complete-car manufacturer and a car-part manufacturer with data obtained as a result of execution of the function to gather, process and analyze information in accordance with the flowchart explained so far.

1: At a step S14, data is sold and provided to a complete-car manufacturer by way of a network at a request made by the complete-car manufacturer to purchase the data. Similarly, at a step S15, data is sold and provided to a car-part manufacturer by way of a network at a request made by the car-part manufacturer to purchase the data. A network can be selected according to means suitable for the client need over the whole public network.

2: The data is encrypted prior to the transmission to prevent the data from being stolen by another manufacturer.

3: The complete-car manufacturer and the car-part manufacturer receiving data are expected to utilize the data as follows.

Applications of Statistics and Analyzed Data

1: The statistics and the analyzed data, which indicate the age bracket of vehicle users as well as days of the week and periods of time on the days to drive the vehicle for a certain car type, are used in a study to determine a function that the car type lacks as well as an excessive function of the car type, to set a price and to achieve other purposes.

2: If the central vehicle-information management center 6 has confirmed information indicating that a number of users are utilizing a new function provided as a function to exhibit characteristics superior to vehicles produced by other car manufacturers, a study of an application of the new function to another car type is conducted. If only few users are utilizing the new function, on the other hand, the new function may be removed as a standard facility to allow the already set price to be reviewed. In some cases, a decision is made to discontinue the new function.

3: The complete-car manufacturer or the car-part manufacturer introduces presently well-sold car types and currently popular functions classified by customer age and customer gender, allowing marketing public relation activities to be carried out in accordance with customer ages and genders.

Applications of Statistics and Analyzed Data Classified by Car Part

4: By identifying a mean-time between failures of each part, it is possible to determine whether or not the life of the part has been stated correctly.

5: When the user or the driver reports an abnormality, raw information and performance-analysis data before and after the occurrence of the abnormality are put in a package and submitted to a car repair center or a car dealer. The information package is useful for identifying the cause of the abnormality, which is normally difficult to reproduce.

Next, a service of providing data to used-car dealers is explained.

At a step S18 of the flowchart shown in FIG. 5, the central vehicle-information management center 6 renders a service of the vehicle-information gathering system shown in FIG. 1 to sell and provide data collected by using the function to gather, process and analyze information to a used-car dealer, a car dealer or somebody desiring to sell his or her car.

1: A person wanting to purchase a car connects itself to the central vehicle-information management center 6 in order to obtain an assessed value of its present car.

2: The central vehicle-information management center 6 determines an assessed value in detail from information for determining the internal state of the engine and information on traveled areas each inflicting a damage on the car in addition to the inspection history, the traveled distance, the type and the model of the car, the value of which is being assessed. The information for determining the internal state of the engine includes information on control of the engine, information on a steering-angle speed, an ABS cumulative operating time and a VSC cumulative operating time. Examples of areas each inflicting an injury on a car are a seashore and a snowy place, which may both inflict a salty damage.

3: The above service-rendering system can be applied to provide a service to a car dealer, a used-car dealer, a car scrapper and an automotive equipment factory, which may purchase a used car.

Next, a service to provide data to an environment protection office is explained.

The data stored by the function to gather, process and analyze information in accordance with the flowchart described earlier includes information on environments to be provided to the environment protection office.

1: Information indicating whether or not noxious gas emitted by a car engine meets an environmental standard is picked up at random for examination.

2: The information is subjected to a statistical analysis for each car type and if the number of vehicles with a car type thereof not meeting the environmental standard exceeds a predetermined value, the environment protection office gives the car manufacturer an advice to improve the car type.

Next, a service to provide data to a car-renting company and a car renter is explained.

The data stored by the function to gather, process and analyze information in accordance with the flowchart described earlier includes information on the position of a vehicle to be provided to a car-renting company.

Information For Car-renting Company

1: When the renting period of a rented car or a car used in a community transport is over, the rented car or the community-transport car automatically transmits its current position to the central vehicle-information management center 6 by way of the HEO path.

2: The central vehicle-information management center 6 transmits the information to the car management company, allowing the company to detect the area of the car with the ended renting period. The information on the position of the car may be presented as a latitude and a longitude, a geographical name, a graphical screen displaying a map.

A community transport is a city car-renting system for a certain district. The community transport rents a car usually for joint use and allows the renter to leave the car at any area at the end of the rent period.

Information For Rented-car User

1: A service to transmit commercial information of a region to the user of a rented car is rendered by another company called a commercial-information providing company.

2: A commercial-information providing company makes a cooperation contract with a car-renting company to allow the latter to charge a car-rent fee to the former in case the rented-car user agrees to disseminate the commercial information to others.

3: The commercial information can be presented through a navigation monitor or as a sound.

Next, a service to provide data to an electronic road pricing board of a self-government office is explained.

The data stored by the function to gather, process and analyze information in accordance with the flowchart described earlier includes information on regulations of trespassing through a controlled area including a self-government boundary, information on a time the car enters a controlled area and the cumulative time of a car movement in the controlled area, which are supposed to be provided to the self-government office.

1: When a car approaches a controlled area, the central vehicle-information management center 6 automatically provides the car through the HEO path with information indicating that:
  the area the car is approaching is a controlled area; and
  if the car travels the controlled area, a fee will be charged to the car typically on an hourly basis.

A judgment as to whether or not the car has entered the controlled area can be based on information on the position of the car obtained from an onboard GPS functional interlock system (the car navigation apparatus) or a DSRC system on the road without using an HEO path.

2: After the above information provided by the central vehicle-information management center 6 is received, the car onboard equipment 2 keeps forming a judgment as to whether or not the car has entered the controlled area. As soon as the car enters the controlled area, the car transmits a time the car entered the controlled area and the cumulative time of a movement in the controlled area to the central vehicle-information management center 6 by way of the HEO path.

3: As a payment method, a later total bill, an immediate payment by using an electronic transaction card (ETC card) or a prepaid technique can be adopted.

Next, a service to provide data to a loss-insurance company is explained.

At a step S16 of the flowchart shown in FIG. 5, the data stored by the function to gather, process and analyze information in accordance with the flowchart described earlier is sold and provided to a loss-insurance company to be used in processing such as computation of an insurance premium and determination of a fraction of responsibility to be borne by the driver in the event of an accident.

1: A service to collect an insurance premium for insuring a car against an accident only during a period of time to use the car is rendered. Methods of paying a premium of an on-demand insurance include a later payment method of a total premium for a predetermined period such as 1 month, a payment using an ETC card and a payment using a card at the end of a driving session in addition to the pre-payment method. An on-demand insurance is suitable for a user which does not drive a car frequently or a weekend user. The premium of such on-demand insurance is cheaper than a yearly insurance.

2: An insurance premium is computed by differentiating a frequently used travel road and an infrequently used travel road and differentiating a route passing through an area with a record of many accidents from a route passing though areas with a record of few accidents. It should be noted that a latitude and a longitude of the current position of a car may not be provided in order to protect the privacy of the user. The car onboard equipment 2 distinguishes a frequently used travel road from an infrequently used travel road and a route passing through an area with a record of many accidents from a route passing though areas with a record of few accidents, and transmits code information as a result of differentiation instead. For example, a code of 0 is assigned to a road not traveled for the past year and a code 1 is assigned to other roads. Similarly, a code of 2 is assigned to a route passing through an area with a record of many accidents. In addition, a place and a time at which the car is driven do not have to be included in the data provided to the loss-insurance company.

Figure 6:
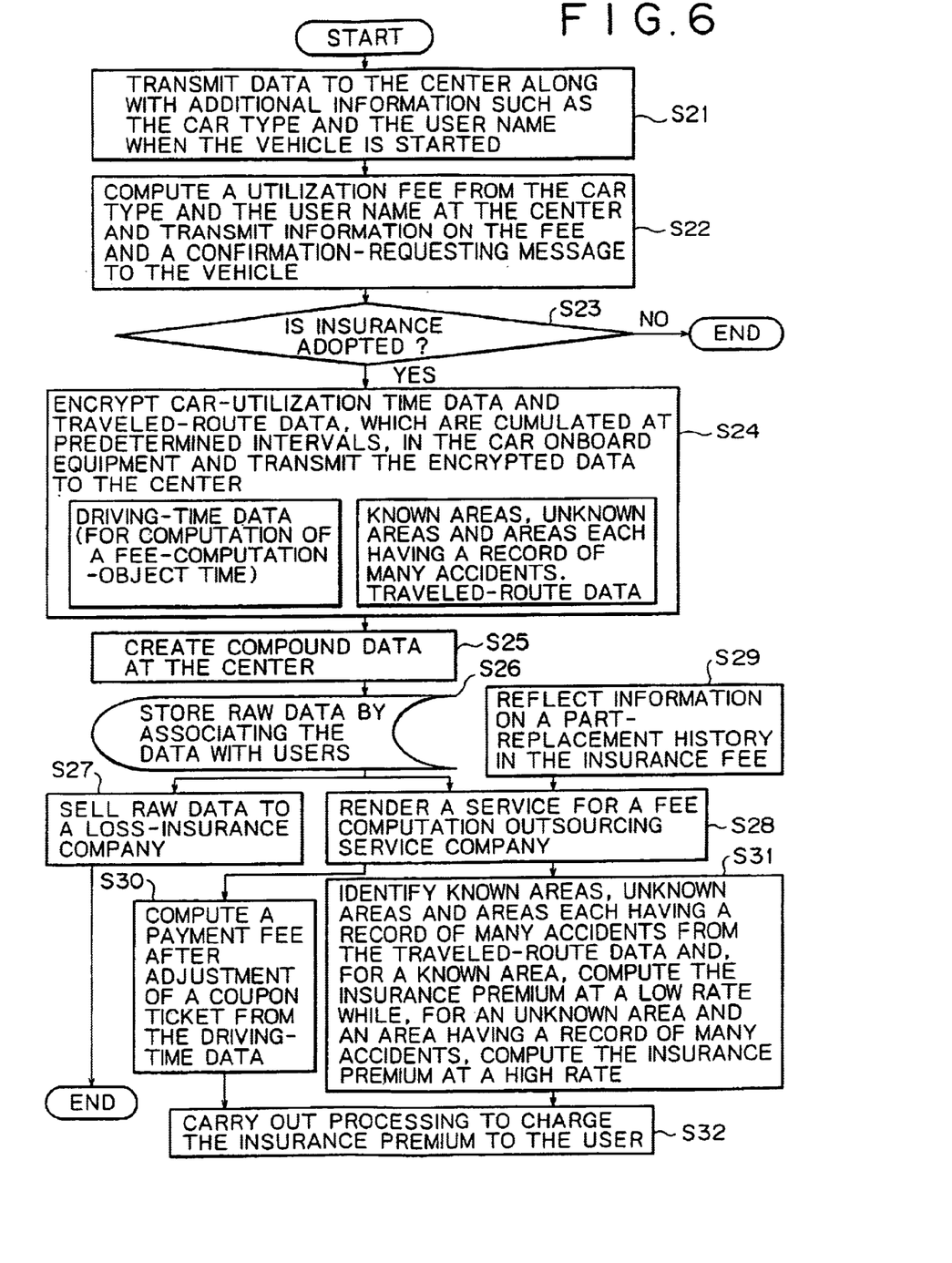
FIG. 6 shows a flowchart representing a method of rendering a service to present information on a vehicle.

A service to provide information on a vehicle to a loss-insurance company for computation of a vehicle insurance premium is explained by referring to a flowchart shown in FIG. 6.

1: At a step S21 right after the user serving as the driver of the vehicle 1 turns on the ignition key to start the engine, an activation start signal is transmitted automatically from the vehicle 1 to the central vehicle-information management center 6. To put it in detail, at the step S21 of the flowchart shown in FIG. 6, the following pieces of information are transmitted from the vehicle 1 to the central vehicle-information management center 6:

1-1: Information on a position of the vehicle
1-2: Information on control of the vehicle
1-3: Information on states of vehicle parts In addition to the above pieces of information, additional information such as the type of the car and the name of the user is also transmitted to the central vehicle-information management center 6 to be collected therein for creating statistics.

2: At the next step S22, the central vehicle-information management center 6 computes a utilization service fee from the type of the car and the name of the user and transmits the fee and a confirmation-requesting message to the vehicle 1. At the next step S23, the user is requested to form a judgment as to whether or not to effect insurance. In this embodiment, an inquiry about whether or not the user will effect insurance is transmitted to the user and an insurance contract can be made on that occasion. An insurance contract can of course be made in advance. In this case, the insurance term can be limited to a fixed period. In addition, in the case of this embodiment, the insurance term can be set at a short period such as only the day on which the insurance contract is made or few days adjusted to a travel schedule. Thus, since the insurance term is stated explicitly on the contract, the term can be treated as a fixed period.

3: If the user makes a decision to effect the insurance, the flow of the processing goes on to a step S24 at which car-utilization time data and traveled-route data, which are computed at fixed intervals, are encrypted in the car onboard equipment 2 and transmitted to the central vehicle-information management center 6. The pieces of data can also be measured continuously instead of being measured at fixed intervals. In this case, only peculiar items of the collected data are recorded.

Driving time data is acquired for use in calculation of fee-computation-object time data. In dependence on the substance of the insurance contract, the entire driving time can be used as the fee-computation-object time. In addition, pieces of traveled-route data for known and unknown areas as well as areas with a record of many accidents, which are traveled by the vehicle 1, are collected. A central management system employed in the central vehicle-information management center 6 catalogs data for such areas, or is capable of confirming that such data has not been cataloged. Other information on driving habits and the vehicle can also be converted into data. For examples, the frequencies of abrupt braking, abrupt steering and abrupt transmission and data representing acceleration cumulative values of the abrupt-braking, abrupt-steering and abrupt-transmission items can also be gathered. Instead of data for such areas, data for regions including the areas can be generated. In the following description, data for areas is explained. At a step S25 of the flowchart shown in FIG. 6, these pieces of data are decoded in the central vehicle-information management center 6 and, at the next step S26, the decoded data is recorded as pieces of raw data classified by user. That is to say, the raw data is recorded for a loss-insurance company, a fee computation outsourcing service company and the user.

4: The gathered data completing a statistical analysis is used for selling raw data to a loss-insurance company at a step S27 and presented to the fee computation outsourcing service company at a step S28. In addition, at a step S29, information on a part-replacement history is presented separately to the fee computation outsourcing service company as data to be reflected in calculation of an insurance premium. Information on a past periodical-inspection and part-replacement history such as the number of days lapsing since a part replacement is collected. If the vehicle 1 includes a memory for storing the information, the information is retrieved from the memory and transmitted from the vehicle 1. Otherwise, the information is collected from a person in charge of replacement of a car part through a network.

5: At a step S30, the fee computation outsourcing service company computes and confirms a fee-computation-object time from the driving time data. For example, the fee computation outsourcing service company computes a fee after adjustment of a coupon ticket. From the traveled-route data, known areas, unknown areas and areas each having a record of many accidents can be identified at the next step S31. For a known area, the insurance premium is computed at a low rate while, for an unknown area and an area having a record of many accidents, the insurance premium is computed at a high rate. The setting of an insurance premium is referred to as weighting of an insurance premium. Instead of using an insurance premium rate for a basic insurance premium, it is needless to say that the insurance premium itself can also be computed.

For a vehicle under a contract, the driving time in a predetermined period of time is found and collected. In addition, traveled-route data for areas passed through by the driven vehicle is also gathered. The areas include a movement route and a sub-area. From the driving-time data, fee-computation-object time data is found. An insurance premium weight is found from the fee-computation-object time data or the traveled-route data or both. Then, an insurance premium to be charged to the driver is calculated from the fee-computation-object time data, the traveled-route data and the insurance premium weight, and displayed. Of course, a point count can be found from the driving-time data and another point count can be found from the number of points for specific traveled areas and an insurance premium to be charged to the driver is calculated from these point counts. Even with this technique, the setting of a fee-computation-object time as an object of computation and the use of traveled-route data to find a point count themselves are adoption of the insurance premium weighting. In addition, for the insurance premium weighting, information on the control of the vehicle, information on states of vehicle parts, information on the vehicle indicating whether the vehicle is a used car or a new car, information on the user or information on a part-replacement history or a combination of these pieces of information may be used as other information.

6: At a step S32 of the flowchart shown in FIG. 6, processing to charge an insurance premium to the user is carried out. The insurance premium can be paid by using a card described earlier in a later-payment method whereby money for paying the fee is drawn from a bank account specified by the card.

The processing to demand a payment from the user includes processing to charge a PL (Product Liability) insurance premium to the complete-car manufacturer or a car-part manufacturer and processing to charge an insurance premium based on an accident mistake ratio analysis to the complete-car manufacturer or a car-part manufacturer.

It should be noted that, by gathering information on the state of a vehicle and creating statistics thereof as described earlier, a statistical analysis can be conducted. Thus, an insurance premium can be revised by reviewing the amount of payment for a vehicle insurance premium based on the contemporary payment method when the insurance contract is renewed.

In accordance with the present invention, information on a vehicle including information on the present position of the vehicle can be collected in a real-time manner to create statistics. As a result, very useful information on a vehicle can be gathered.

For example, a complete-car manufacturer or a car-part manufacturer is capable of conducting a statistical analysis on the information on a vehicle to produce marketing data for each car type and data to be fed back to a design team.

What is claimed is:

1. A method of gathering and analyzing information on a plurality of vehicles, comprising:

(a) for each vehicle, acquiring by an information management center at least one of the following pieces of information:
      (a1) position information regarding the position of the vehicle;
      (a2) vehicle information regarding control of the vehicle and/or conditions of vehicle parts;
      (a3) information generated by a sensor provided on the vehicle;
      (a4) information on a state of the vehicle obtained by a diagnosing system provided on the vehicle; and
      (a5) vehicle identification information including a vehicle type and/or a vehicle number;

(b) conducting a statistical analysis, based on the acquired information, on how much an installed new function has been used; and (c) storing results of the statistical analysis in a database.

2. The method of claim 1, wherein the statistical analysis in step (b) is performed for each vehicle type and/or vehicle part.

3. An apparatus of gathering and analyzing information on a plurality of vehicles, comprising:

(a) a vehicle information gathering device for acquiring at least one of the following pieces of information for each vehicle:
      (a1) position information regarding the position of the vehicle;
      (a2) vehicle information regarding control of the vehicle and/or conditions of vehicle parts;
      (a3) information generated by a sensor provided on the vehicle;
      (a4) information on a state of the vehicle obtained by a diagnosing system provided on the vehicle; and
      (a5) vehicle identification information including a vehicle type and/or a vehicle number;

(b) an information processing device for carrying out a statistical analysis, based on the acquired information, on how much an installed new function has been used; and (c) a storage device for storing results of the statistical analysis.

4. The apparatus of claim 3, wherein the information processing device carries out the statistical analysis for each vehicle type and/or vehicle part.

* * * * *